United States Patent
Yu

(10) Patent No.: US 8,611,367 B2
(45) Date of Patent: Dec. 17, 2013

(54) METHOD AND APPARATUS FOR ALLOCATING TIME SLOTS IN BASEBAND EPCN SYSTEM

(75) Inventor: Yang Yu, Beijing (CN)

(73) Assignee: Hangzhou H3C Technologies Co., Ltd., Hangzhou, Zhejiang Province (CN)

(*) Notice: Subject to any disclaimer, the term of this patent is extended or adjusted under 35 U.S.C. 154(b) by 891 days.

(21) Appl. No.: 12/471,592

(22) Filed: May 26, 2009

(65) Prior Publication Data

US 2009/0296733 A1 Dec. 3, 2009

(30) Foreign Application Priority Data

May 27, 2008 (CN) .......................... 2008 1 0108233

(51) Int. Cl.
*H04J 3/16* (2006.01)
(52) U.S. Cl.
USPC ........................................ 370/458
(58) Field of Classification Search
None
See application file for complete search history.

(56) References Cited

U.S. PATENT DOCUMENTS

| | | | | |
|---|---|---|---|---|
| 5,940,370 A * | 8/1999 | Curtis et al. | ................... | 370/231 |
| 7,193,986 B2 * | 3/2007 | Scanlon et al. | ................ | 370/338 |
| 8,023,924 B2 * | 9/2011 | Kim et al. | ................... | 455/343.4 |
| 8,036,702 B2 * | 10/2011 | Etemad | ...................... | 455/553.1 |
| 2002/0045458 A1 * | 4/2002 | Parantainen et al. | .......... | 455/466 |
| 2003/0002519 A1 * | 1/2003 | Terry et al. | ..................... | 370/445 |
| 2007/0109989 A1 * | 5/2007 | Nakagawa et al. | ........... | 370/328 |
| 2008/0037468 A1 * | 2/2008 | Zisimopoulos et al. | ...... | 370/331 |
| 2008/0123527 A1 * | 5/2008 | Shahidi et al. | ................ | 370/231 |
| 2008/0225737 A1 * | 9/2008 | Gong et al. | .................... | 370/252 |
| 2009/0010228 A1 * | 1/2009 | Wang et al. | .................... | 370/335 |
| 2009/0249153 A1 * | 10/2009 | Zhang | ........................... | 714/748 |
| 2009/0274078 A1 * | 11/2009 | Zhao et al. | .................... | 370/293 |
| 2010/0177669 A1 * | 7/2010 | Suo et al. | ...................... | 370/280 |
| 2010/0278083 A1 * | 11/2010 | Kwak et al. | ................... | 370/280 |

FOREIGN PATENT DOCUMENTS

| | | |
|---|---|---|
| CN | 1282493 A | 1/2001 |
| CN | 1965513 A | 5/2007 |
| WO | 99/26430 A1 | 5/1999 |

* cited by examiner

*Primary Examiner* — Hassan Kizou
*Assistant Examiner* — Roberta A Shand
(74) *Attorney, Agent, or Firm* — Ladas & Parry LLP

(57) ABSTRACT

A method and apparatus for allocating time slots in a baseband EPCN system is provided. The method includes: obtaining a period type of a current period; and determining a proportion between uplink time slots and downlink time slots for the current period according to the period type. According to present invention, different proportions between uplink time slots and downlink time slots may be respectively applied to different periods such as a registration period and a communication period in the baseband EPCN system. Thus, the register time of a new CNU in the registration period is shortened and the requirement for high downlink bandwidth for normal communications in the communication period is guaranteed at the same time.

7 Claims, 3 Drawing Sheets

METHOD AND APPARATUS FOR ALLOCATING TIME SLOTS IN BASEBAND EPCN SYSTEM

FIELD OF THE INVENTION

The present invention relates to communication fields, and more particularly, to method and apparatus for allocating a time slot in a baseband Ethernet-Passive-Coax Network (EPCN) system.

BACKGROUND OF THE INVENTION

The baseband EPCN system refers to an Ethernet running on a coaxial network and adopts a point-to-multipoint coaxial distribution network as physical layer transmission medium. The coaxial distribution network may have, e.g. a star topology or a tree topology, etc.

The structure of the baseband EPCN system is shown in FIG. 1. A typical baseband EPCN system includes a Coax Line Terminal (CLT), a Coax Network Unit (CNU) and a coaxial distribution network, etc. The CLT is located in corridor or where a community optical node is located. The CNU is located where a user resides and functions as a Customer Premise Equipment (CPE) for access of a user terminal, or is integrated with products such as corridor switch to function as an uplink interface of the corridor switch. The coaxial distribution network is a network from a CATV optical node location to user's home. Besides coaxial cable, the coaxial distribution network further includes apparatuses such as active amplifier, branch/distributor, etc.

The baseband EPCN system mainly applied for user's broadband network access and video on demand, etc. These applications mainly request a high downlink bandwidth while have a low requirement for uplink bandwidth where the user residents. The baseband EPCN system is a time-division system based on physical channels. Accordingly, in a communication period, the system requires that an uplink period is longer than a downlink period in most situations, i.e., the downlink bandwidth is greater than the uplink bandwidth (e.g. 8:2). In a registration period, an un-registered CNU send a Register message to the CLT in the uplink period. The longer the uplink period, the more CNUs are allowed to register. Accordingly, average register time of a new CNU becomes shorter.

In a conventional baseband EPCN system, the proportion between the uplink bandwidth and the downlink bandwidth keeps unchanged in the registration period and the communication period. For example, the downlink always occupies 80% time-slots while the uplink always occupies 20% time-slots. As a result, it is impossible to satisfy requirements for both short register time and high downlink bandwidth at the same time. When the average register time of a new CNU is reduced, the downlink bandwidth in the communication period is reduced simultaneously. If the downlink bandwidth in the communication period is ensured, the average register time of the new CNU becomes longer in the registration period.

SUMMARY OF THE INVENTION

The present invention provides a method and apparatus for allocating time slots in a baseband EPCN system, so as to adjust, according to the type of a current period, a proportion between uplink time slots and downlink time slots of the current period to satisfy requirements of different periods.

According to an embodiment of the present invention, a method for allocating time slots in a baseband EPCN system is provided. The method includes: obtaining a period type of a current period; determining a proportion between uplink time slots and downlink time slots for the current period according to the period type.

Preferably, before obtaining the period type of the current period, the method further includes: starting a timer in advance, and when the timer reaches a predetermined time, resetting the timer and performing said obtaining the period type of the current period.

Preferably, said obtaining the period type of the current period includes: obtaining the period type of the current period according to runtime and configurations locally set for different period types.

Preferably, said determining the proportion between uplink time slots and downlink time slots for the current period according to the period type includes: if the period type is a communication period, determining to allocate more downlink time slots than uplink time slots in the communication period; if the period type is a registration period, determining to allocate more uplink time slots than downlink time slots in the registration period.

Preferably, after determining the proportion between uplink time slots and downlink time slots for the current period according to the period type, the method further includes: notifying a Coax Network Unit (CNU) of an available time slot according to the proportion between uplink time slots and downlink time slots for the current period.

According to another embodiment of the present invention, an apparatus for allocating time slots in a baseband EPCN system is provided. The apparatus includes: a period-type obtaining unit, adapted to obtain a period type of a current period; and a time-slot proportion determining unit, adapted to determine a proportion between uplink time slots and downlink time slots for the current period according to the period type obtained by the period-type obtaining unit.

Preferably, the apparatus further includes: a timing unit, adapted to start a timer in advance, and when the timer reaches a predetermined time, reset the timer and notify the period-type obtaining unit to obtain the period type of the current period.

Preferably, the period-type obtaining unit includes: a runtime obtaining sub-unit, adapted to obtain runtime of the apparatus; a configuration obtaining sub-unit, adapted to obtain configurations set by the apparatus for different period types; and a period-type obtaining sub-unit, adapted to obtain the period type of the current period according to the runtime obtained by the runtime obtaining sub-unit and the configurations for different period types obtained by the configuration obtaining sub-unit.

Preferably, the time-slot proportion determining unit includes: a first time-slot proportion determining sub-unit, adapted to determine to allocate more downlink time slots than uplink time slots when the period type obtained by the period-type obtaining unit is a communication period; and a second time-slot proportion determining sub-unit, adapted to determine to allocate more uplink time slots than downlink time slots when the period type obtained by the period-type obtaining unit is a registration period.

Preferably, the apparatus further includes: a notifying unit, adapted to notify a Coax Network Unit (CNU) of an available time slot according to the proportion between uplink time slots and downlink time slots for the current period determined by the second time-slot proportion determining unit.

Compared with prior art, the present invention has the following advantages: different proportions between uplink time slots and downlink time slots may be respectively applied to different periods such as registration period and communication period in the baseband EPCN system. Therefore, the register time of a new CNU in the registration period can be shortened and the requirement for high downlink bandwidth for normal communications in the communication period can be guaranteed at the same time.

DETAILED DESCRIPTION OF THE INVENTION

The present invention will be described hereinafter in detail with reference to accompanying drawings and embodiments.

In the baseband EPCN system, it is required that a new CNU becomes on-line quickly. For example, after the CNU is started, it is hoped that the CNU can complete the registration and become on-line in short time (e.g. 100 ms) so that normal communications between the CNU and the CLT may start. In the baseband EPCN system, the registration of the CNU is completed during a registration period. Generally, the CLT allocates one registration period every several communication periods (e.g. 30 communication periods). In the allocated registration period, all off-line CNUs start to send Register messages to the CLT. The difference between the registration period and the communication period is that: in the communication period, the uplink communication period is occupied by registered CNUs, and a sequence of the CNUs and a time slot occupied by each CNU are both allocated by the CLT; whereas in the registration period, the uplink time slots are reserved for all un-registered CNUs.

Figure 1:
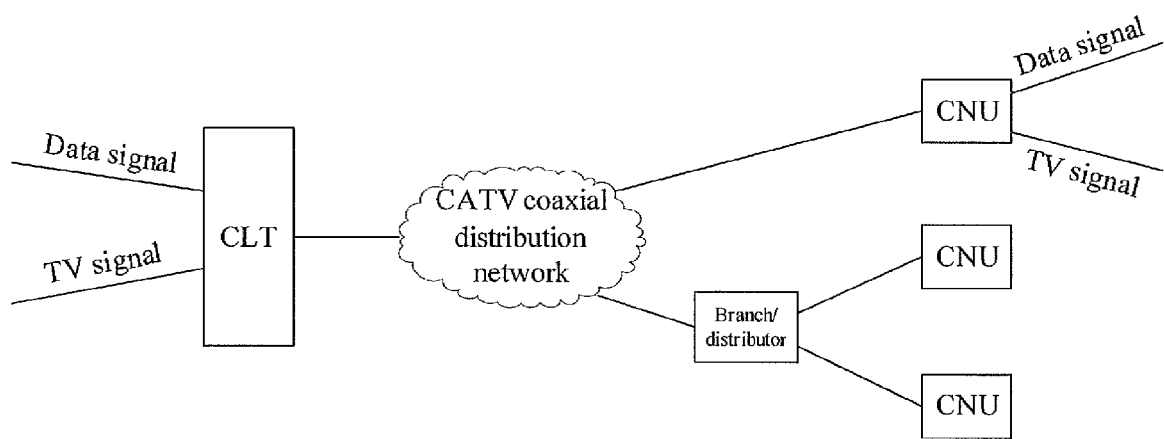
FIG. 1 is a schematic diagram illustrating a structure of a conventional baseband EPCN system.
Figure 2:
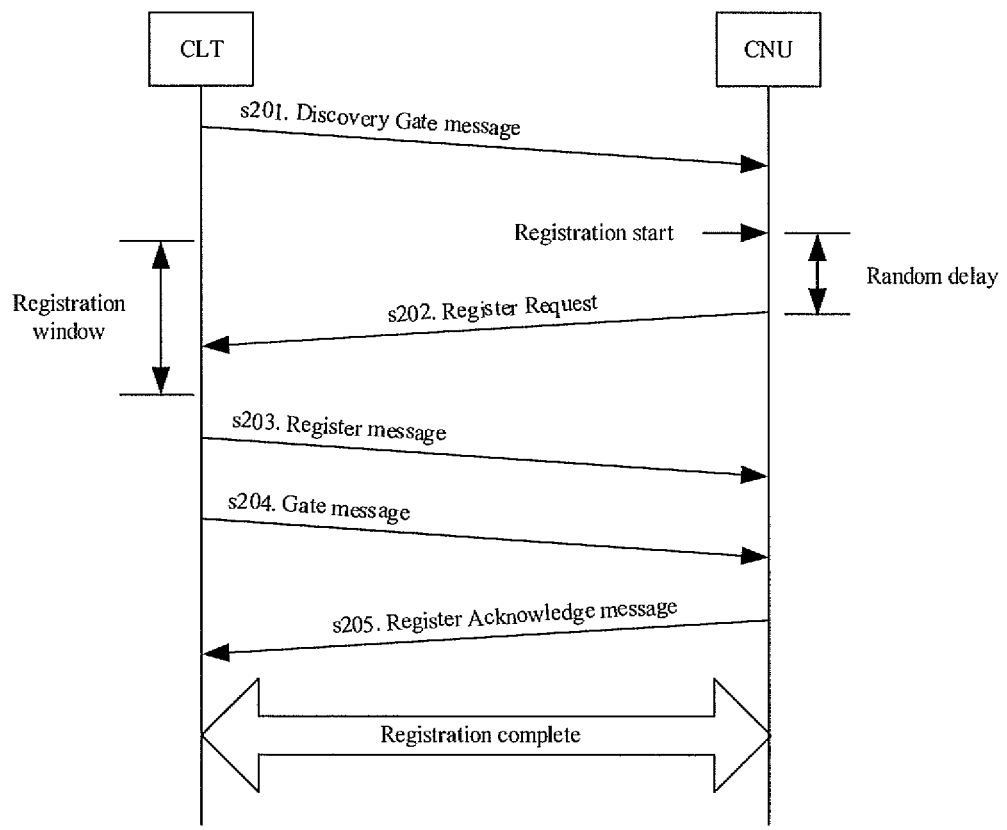
FIG. 2 is a schematic diagram illustrating a register procedure of a new CNU according to an embodiment of the present invention.

The registration procedure of a new CNU is shown in FIG. 2, which includes the following steps.

Step s201: After a CNU is power-on, the CNU waits for a Discovery Gate message sent by a CLT. In the Discovery Gate message, the CLT notifies all CNUs newly powered-on when to start registration.

Step s202: After receiving the Discovery Gate message, the CNU sends a Register Request message to the CLT during a registration period indicated by the Discovery Gate message.

Step s203: After receiving the Register Request message from the CNU, the CLT sends a Register message to the CNU.

Step s204: The CLT sends a normal Gate message in which a time slot is allocated to the newly-registered CNU to send data to the CLT.

Step s205: In the time slot allocated by Gate message, the CNU sends a Register Acknowledge message to the CLT to acknowledge that the registration procedure is complete.

During the above registration procedure, the uplink registration period defined by the CLT may be further divided into several registration windows. A register window refers to the length of time allowed to be occupied by one CNU to send Register message. Obviously, in one registration period, the longer the time reserved to the uplink registration, the more the register windows. Consequently, more new CNUs are allowed to register and the registration time of a new CNU becomes shorter.

If multiple CNUs send Register messages to the CLT in one registration period simultaneously, because the time of sending the Register message by a new CNU is random, it is possible that the Register messages of two or more new CNUs are sent at the same time. In case that two or more new CNUs send the Register messages at the same time, waves are overlapped in a physical line and therefore the CLT cannot receive any of the Register messages correctly. Consequently, those new CNUs cannot receive response messages from the CLT, and will re-start the registration procedure in the register window of a subsequent registration period after a random delay.

As can be seen from the above description, in the registration period, the un-registered CNUs send the Register messages to the CLT in the uplink period. The longer the uplink period, the more new CNUs are allowed to register. And the average register time of a new CNU becomes shorter. With respect to the baseband EPCN system, the proportion between uplink bandwidth and downlink bandwidth keeps unchanged in both the registration period and the communication period. As a result, it is impossible to give attention to both short register time and high downlink bandwidth at the same time. When the average registration time of a new CNU is shortened, the downlink bandwidth of the communication period is reduced simultaneously. If the downlink bandwidth of the communication period is guaranteed, the average registration time of a new CNU becomes longer in the registration period.

An embodiment of the present invention provides a method and apparatus for allocating time slots in the baseband EPCN system. The core idea is that: the CLT determines whether a current period is a registration period or a communication period and applies different proportions between uplink time slots and downlink time slots to different types of periods.

Figure 3:
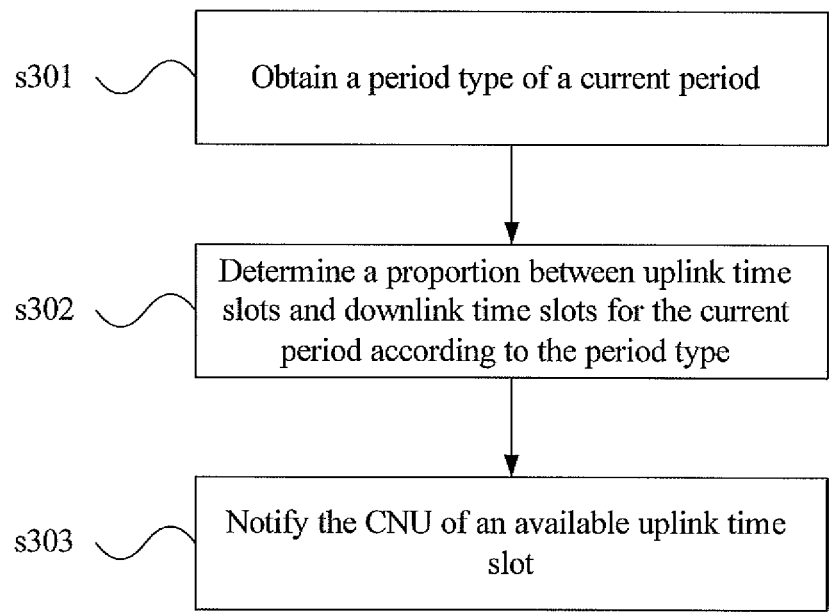
FIG. 3 is a flowchart illustrating a method for allocating time slots in the baseband EPCN system according to an embodiment of the present invention.

As shown in FIG. 3, a method for allocating time slots in the baseband EPCN system according to an embodiment of the present invention includes the following steps.

Step s301: A period type of a current period is obtained.

In this step, the CLT may obtain the period type of the current period according to runtime as well as configurations locally set for the communication period and the registration period.

Specifically, in the baseband EPCN system, the CLT has the configurations for the communication period and the registration period. After the CLT is powered-on, the allocation of the communication period and the registration period may be determined according to the configurations. For example, the CLT after powered-on may perform one registration period every 30 communication periods. Therefore, according to the configurations for the communication period and the registration period as well as the runtime after powered-on, the CLT may determine the period type of the current period, i.e. whether the current period is a communication period or a registration period.

In addition, the step of obtaining the period type of the current period may be performed periodically. For example, the CLT after powered-on starts a timer, and every time the timer reaches a predetermined time, resets the timer and performs the step of obtaining the period type of the current period. Because the length of the communication period is the same as that of the registration period, the length of the predetermined time may be the length of one communication period or the length of one registration period.

Step s302: A proportion between uplink time slots and downlink time slots for the current period is determined according to the period type.

In this step, the CLT determines the proportion between uplink time slots and downlink time slots for the current period according to the period type. Specifically, with respect to the communication period, it is possible to allocate more downlink time slots than uplink time slots. For example, the proportion between downlink time slots and uplink time slots is 8:2. With respect to the registration period, it is possible to allocate more uplink time slots than downlink time slots. For example, the proportion between downlink time slots and uplink time slots is 2:8.

After determining the proportion between uplink time slots and downlink time slots for the current period, the method for allocating time slots in the baseband EPCN system may further includes the following steps.

Step s303: The CNU is notified of an available uplink time slot.

In this step, after determining the proportion between uplink time slots and downlink time slots according to the period type of the current period, the CLT may notify the CNU of an uplink time slot which may be used by the CNU to adjust the time for transmitting data on the uplink direction.

Specifically, in the baseband EPCN system, time slots occupied by the CLT and all the CNUs in a period are allocated by the CLT. Therefore, after determining the proportion between uplink time slots and downlink time slots, the CLT may notify each CNU of an uplink time slot which may be used by the CNU. In detail, in all periods, it is always the CLT that send a message to the CNU firstly. Therefore, in the message (such as a Gate message) sent by the CLT, a specific uplink time slot may be designated for a specific CNU to send data to the CLT.

According to the above method provided by embodiments of the present invention, different proportions between uplink time slots and downlink time slots may be respectively applied to different periods such as a registration period and a communication period in the baseband EPCN system. Therefore, in the communication period, there may be more downlink time slots than uplink time slots, which meets the requirement for the downlink bandwidth in the communication period. In the registration period, there may be more uplink time slots than downlink time slots. Thus more uplink register windows are allowed in the registration period, i.e. the number of new CNUs registered successfully in one registration period is increased, and consequently the register time of a new CNU is shortened and the register speed of the new CNU is increased.

An embodiment of the present invention provides an apparatus for allocating time slots in the baseband EPCN system. The apparatus may be the CLT and its structure is shown in FIG. 4.

Figure 4:
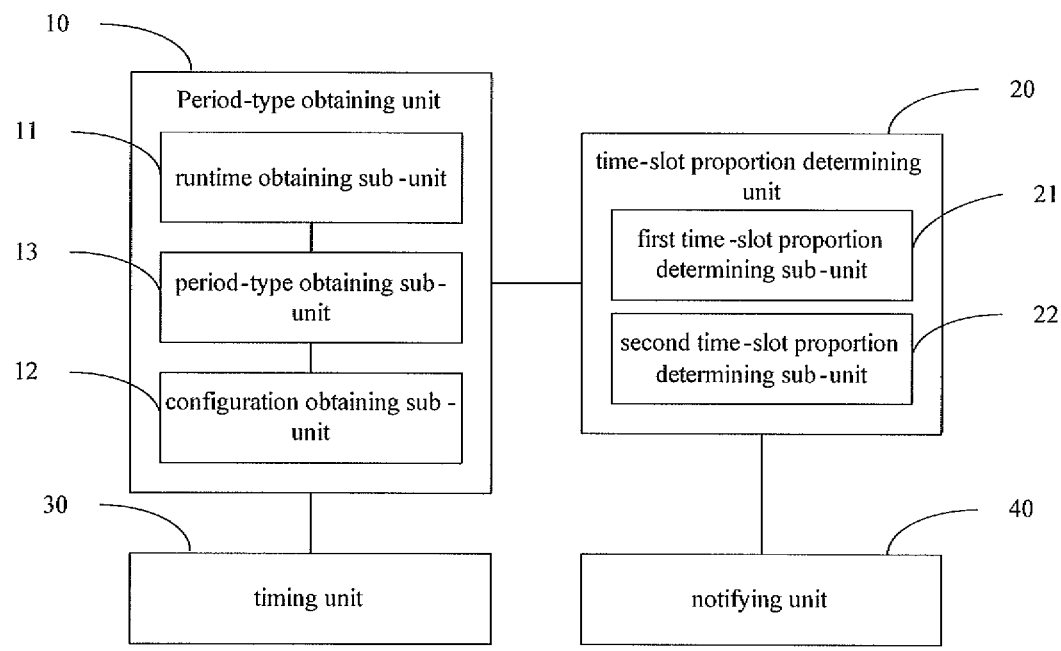
FIG. 4 is a schematic diagram illustrating a structure of an apparatus for allocating time slots in the baseband EPCN system according to an embodiment of the present invention.

As shown in FIG. 4, the CLT includes:

a period-type obtaining unit 10, adapted to obtain a period type of a current period, the period type including a communication period and a registration period; and a time-slot proportion determining unit 20, adapted to determine a proportion between uplink time slots and downlink time slots for the current period according to the period type obtained by the period-type obtaining unit 10.

Preferably, the apparatus further includes: a timing unit 30 and a notifying unit 40.

The timing unit 30 is adapted to start a timer in advance, and every time the timer reaches a predetermined time, reset the timer and notify the period-type obtaining unit 10 to obtain the period type of the current period. The length of the predetermined time may be the length of one communication period or the length of one registration period.

The notifying unit 40 is adapted to notify a CNU of an available uplink time slot according to the proportion between uplink time slots and downlink time slots determined by the time-slot proportion determining unit 20 for the current period. For example, it is possible to designate in a Gate message that a specific CNU may occupy a specific uplink time slot to send data to the CLT.

In addition, the period-type obtaining unit 10 specifically includes:

a runtime obtaining sub-unit 11, adapted to obtain runtime of the apparatus;

a configuration obtaining sub-unit 12, adapted to obtain configurations set by the apparatus for different period types; and a period-type obtaining sub-unit 13, adapted to obtain the period type of the current period according to the runtime obtained by the runtime obtaining sub-unit 11 as well as the configurations for different period types obtained by the configuration obtaining sub-unit 12.

In addition, the time-slot proportion determining unit 20 specifically includes:

a first time-slot proportion determining sub-unit 21, adapted to determine to allocate more downlink time slots than uplink time slots when the period type obtained by the period-type obtaining unit 10 is the communication period; and a second time-slot proportion determining sub-unit 22, adapted to determine to allocate more uplink time slots than downlink time slots when the period type obtained by the period-type obtaining unit 10 is the registration period.

According to the apparatus provided by the embodiment of the present invention, different proportions between uplink time slots and downlink time slots may be respectively applied to different periods such as the registration period and the communication period in the baseband EPCN system. Therefore, the register time of a new CNU in the registration period is shortened and the requirement for high downlink bandwidth for normal communications in the communication period is also guaranteed.

According to the above description of embodiments, it can be clearly understood by those skilled in the art that the present invention can be realized by software accompanying with necessary general hardware platforms, or by hardware. In many cases, the former is a preferred implementation manner. Based on this, the technical solution of the present invention or the contribution part of the present invention can be implemented by a software product. The software product is stored in a storage medium and includes codes to make a network apparatus perform the method in embodiments of the present invention.

The foregoing is only embodiments of the present invention. The protection scope of the present invention, however, is not limited to the above description. Any change or substitution, easily occurring to those skilled in the art, should be covered by the protection scope of the present invention.

What is claimed is:

1. A method for allocating time slots in a baseband Ethernet-Passive-Coax Network (EPCN) system, comprising:

starting a timer, and when the timer reaches a predetermined time, resetting the timer and obtaining a period type of a current period; and determining a proportion between uplink time slots and downlink time slots for the current period according to the period type;

wherein said determining the proportion between uplink time slots and downlink time slots for the current period according to the period type comprises:
if the period type is a communication period, determining to allocate more downlink time slots than uplink time slots in the communication period; and
if the period type is a registration period, determining to allocate more uplink time slots than downlink time slots in the registration period.

2. The method of claim 1, wherein said obtaining the period type of the current period comprises:
obtaining the period type of the current period according to runtime and configurations locally set for different period types.

3. The method of claim 1, wherein said obtaining the period type of the current period comprises:
obtaining the period type of the current period according to runtime and configurations locally set for different period types.

4. The method of claim 1, further comprising:
after determining the proportion between uplink time slots and downlink time slots for the current period according to the period type, notifying a Coax Network Unit (CNU) of an available time slot according to the proportion between uplink time slots and downlink time slots for the current period.

5. An apparatus for allocating time slots in a baseband Ethernet-Passive-Coax Network (EPCN) system, comprising:
a timing unit, adapted to start a timer, and when the timer reaches a predetermined time, reset the timer and notify a period-type obtaining unit to obtain a period type of a current period;
the period-type obtaining unit, adapted to obtain the period type of the current period; and
a time-slot proportion determining unit, adapted to determine a proportion between uplink time slots and downlink time slots for the current period according to the period type obtained by the period-type obtaining unit;
wherein the time-slot proportion determining unit comprises:
a first time-slot proportion determining sub-unit, adapted to determine to allocate more downlink time slots than uplink time slots when the period type obtained by the period-type obtaining unit is a communication period; and
a second time-slot proportion determining sub-unit, adapted to determine to allocate more uplink time slots than downlink time slots when the period type obtained by the period-type obtaining unit is a registration period.

6. The apparatus of claim 5, wherein the period-type obtaining unit comprises:
a runtime obtaining sub-unit, adapted to obtain runtime of the apparatus;
a configuration obtaining sub-unit, adapted to obtain configurations set by the apparatus for different period types; and
a period-type obtaining sub-unit, adapted to obtain the period type of the current period according to the runtime obtained by the runtime obtaining sub-unit and the configurations for different period types obtained by the configuration obtaining sub-unit.

7. The apparatus of claim 5, further comprising:
a notifying unit, adapted to notify a Coax Network Unit (CNU) of an available time slot according to the proportion between uplink time slots and downlink time slots for the current period determined by the second time-slot proportion determining unit.

* * * * *